US010659362B1

(12) United States Patent
Sellappa et al.

(10) Patent No.: US 10,659,362 B1
(45) Date of Patent: May 19, 2020

(54) TRAFFIC FORWARDING IN LARGE-SCALE NETWORKS

(71) Applicant: Arista Networks, Inc., Santa Clara, CA (US)

(72) Inventors: Sriram Sellappa, Santa Clara, CA (US); Eswaran Baskaran, Santa Clara, CA (US)

(73) Assignee: Arista Networks, Inc., Santa Clara, CA (US)

( * ) Notice: Subject to any disclaimer, the term of this patent is extended or adjusted under 35 U.S.C. 154(b) by 186 days.

(21) Appl. No.: 15/173,390

(22) Filed: Jun. 3, 2016

(51) Int. Cl.
*H04L 12/743* (2013.01)
*H04L 12/723* (2013.01)
*H04L 12/703* (2013.01)
*H04L 12/721* (2013.01)

(52) U.S. Cl.
CPC .......... *H04L 45/7457* (2013.01); *H04L 45/26* (2013.01); *H04L 45/28* (2013.01); *H04L 45/50* (2013.01)

(58) Field of Classification Search
None
See application file for complete search history.

(56) References Cited

U.S. PATENT DOCUMENTS

| 6,247,054 | B1 * | 6/2001 | Malkin | H04L 69/22 709/219 |
| 6,772,223 | B1 * | 8/2004 | Corl, Jr. | H04L 29/06 709/220 |
| 7,940,763 | B1 * | 5/2011 | Kastenholz | H04L 12/2856 370/255 |
| 7,953,885 | B1 * | 5/2011 | Devireddy | H04L 49/70 370/395.21 |
| 8,000,327 | B1 * | 8/2011 | Minei | H04L 45/50 370/392 |
| 8,339,954 | B2 * | 12/2012 | Dahod | H04L 47/10 370/231 |
| 8,879,555 | B2 * | 11/2014 | Du | H04L 45/7453 370/351 |
| 9,806,895 | B1 * | 10/2017 | Kommula | H04L 12/1863 |
| 9,923,798 | B1 | 3/2018 | Bahadur et al. | |
| 2002/0184388 | A1 * | 12/2002 | Yaseen | H04L 12/4641 709/242 |
| 2011/0103263 | A1 * | 5/2011 | Unbehagen | H04L 12/4662 370/254 |

* cited by examiner

*Primary Examiner* — Min Jung
(74) *Attorney, Agent, or Firm* — Haley Guiliano LLP

(57) ABSTRACT

A method for traffic forwarding in a network is provided. The method includes matching a destination IP (Internet protocol) address (DIP) of a packet, in a forwarding information base (FIB) table to point to a next-hop group for the packet, in a first matching operation. The method includes redirecting the packet to a differing next-hop group, responsive to matching each of the next-hop group for the packet and a field of the packet in a second matching operation, wherein the field marks the packet as belonging to a class of service. The method includes routing the packet to a next node, in accordance with the next-hop group or the differing next-hop group as determined for the packet. A network element is also provided.

23 Claims, 5 Drawing Sheets

TRAFFIC FORWARDING IN LARGE-SCALE NETWORKS

BACKGROUND

Networks are growing ever larger, and some mechanisms used for routing packets in networks in smaller networks do not scale well for large-scale networks. A data center may have thousands of nodes, and many data centers may be connected together by networks or an extended network. Customers desire to steer traffic belonging to different traffic classes through different paths in a network. An existing technology, referred to as policy-based routing (PBR), supports this and is scalable. Yet, routers and switches in networks have electronic circuitry that is limited by transistor count, chip size, board size, energy consumption and other practical considerations as to size and scalability. While policy-based routing supports matching on packet fields, and more, which can be implemented using software and/or specialized memory, the route scale that can be handled by a typical router or switch is limited by available transistor counts and sizes of such specialized memory, or software execution speed, or both. It is within this context that the embodiments arise.

SUMMARY

In some embodiments, a method for traffic forwarding in a network is provided. The method includes matching a destination IP (Internet protocol) address (DIP) of a packet, in a forwarding information base (FIB) table to point to a next-hop group for the packet, in a first matching operation. The method includes redirecting the packet to a differing next-hop group, responsive to matching each of the next-hop group for the packet and a field of the packet in a second matching operation, wherein the field marks the packet as belonging to a class of service. The method includes routing the packet to a next node, in accordance with the next-hop group or the differing next-hop group as determined for the packet.

In some embodiments, a network element is provided. The network element is configured to perform a first matching operation to determine a next-hop group for a packet based on a destination Internet protocol (IP) address (DIP) of the packet. The network element is configured to perform a second matching operation based on the next-hop group for the packet and a field of the packet, to determine whether to redirect the packet to a differing next-hop group. The network element is configured to route the packet to a next node according to the next-hop group or the differing next-hop group as determined for the packet.

In some embodiments, a tangible, non-transitory, computer-readable media having instructions thereupon which, when executed by a processor in a network element, cause the processor to perform a method. The method includes performing a first matching operation, to match a destination IP (Internet protocol) address (DIP) of a packet and determine a next-hop group for the packet. The method includes performing a second matching operation, to match the next-hop group for the packet and to match a field of the packet, and determine to redirect the packet to a differing next-hop group. The method includes routing the packet to a node as directed by the differing next-hop group.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
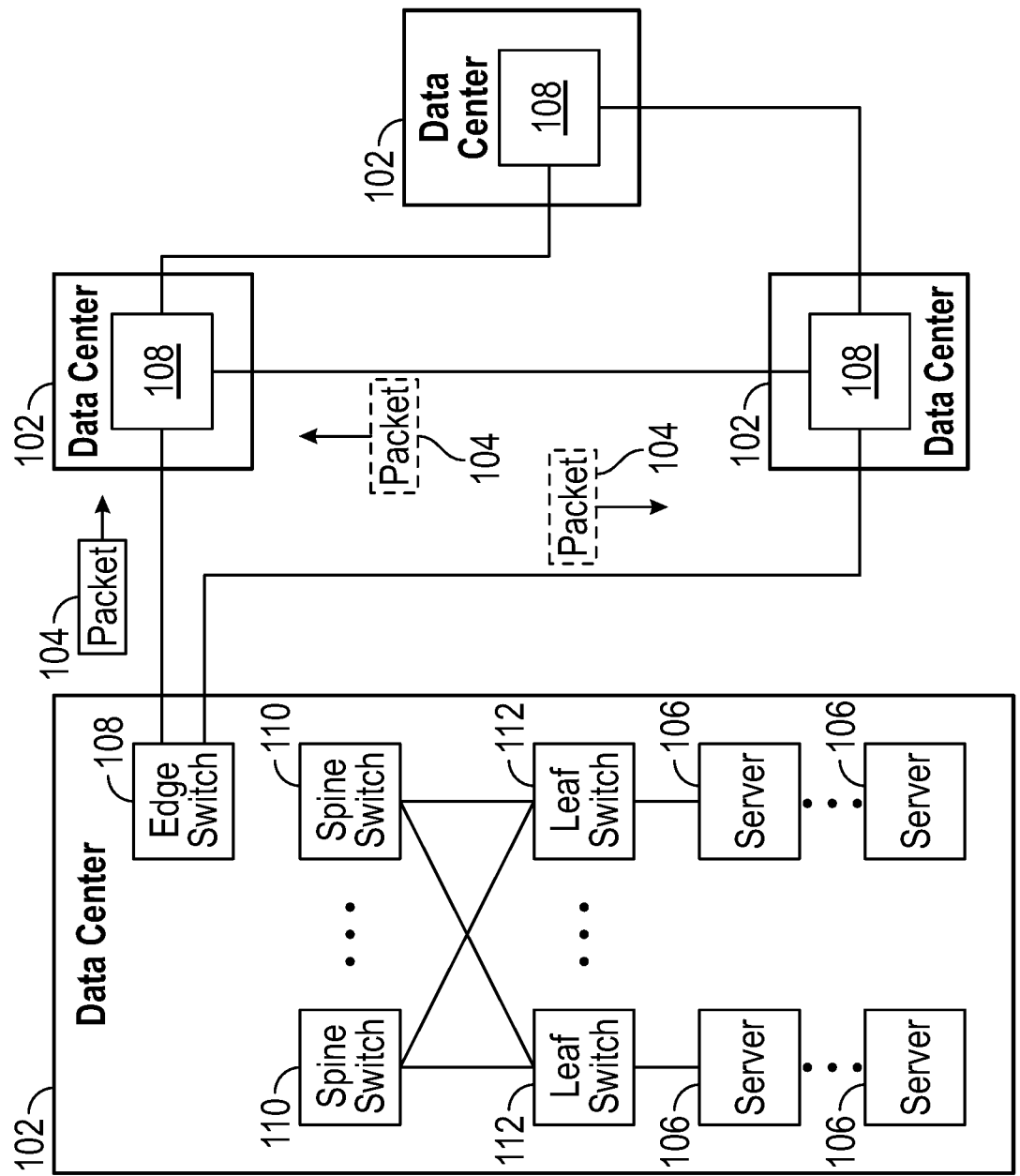
FIG. 1 depicts multiple data centers and networks, or one large extended network, and a packet being routed from one data center to another.

Embodiments of a network router or switch described herein use two, distinct matching operations for network traffic forwarding. The first matching operation is to determine a next-hop group for a packet based on the destination IP (Internet protocol) address (DIP) of the packet. The second matching operation is to reroute or redirect the packet to a differing next-hop group when there is a match to the next-hop group and a match to a service classification or other field of the packet. This applies policy-based routing (PBR) in the second matching operation, which reduces size of attendant software and/or hardware as compared to applying policy-based routing directly to the destination IP address in a single matching operation. Accordingly, the embodiments of the router or switch solve a problem of scalability of network devices in policy-based routing in a manner that improves upon previous solutions and is thus scalable to larger networks for a given set of hardware and software constraints.

In one embodiment, next-hop group is the name of a construct in EXTENSIBLE OPERATING SYSTEM (EOS)™ software. The next-hop group actually represents a multipath object, which lists the paths or tunnels. The forwarding chip, which could be an ASIC (application-specific integrated circuit) computes a hash value from the packet headers and select a path/tunnel from it. The hashing is one scheme for loadbalancing (there are other schemes as well) and is done to ensure that packets of the same flow take the same path in the network.

The embodiments serve to break down (i.e., leverage) the forwarding into two different steps for improving the scalability. A FIB (forwarding information base) table forwards the packet by matching on destination IP (DIP), and the ASIC technology has become quite well-scaled for that problem to support large scale of routes. The FIB table is leveraged to map packets into some grosser granularity. For example, the FIB table could be set up in such a way that all subnets in a data center all point at the same next-hop group (i.e., multi-path object), and this would allow matching on this level of granularity in the second step (i.e., PBR) which needs to match on multiple fields (such as DSCP or differentiated services code point). The typical ASIC technology for implementing this second lookup table is TCAM (ternary content addressable memory), and it is relatively expensive. Thus, by providing the ability to match on the FIB result in PBR the problem is translated into one of having a rich filtering ability (matching on different packet fields) at a grosser granularity of the final destination (e.g., data center, rack in a data center, geographic area, etc). While some embodiments use the FIB results to decipher this grosser granularity, this could also be done in alternative manners. There could for example be an additional table that looks at some packet header fields, and derives a representation of the grosser granularity of the final destination, allowing something like PBR to match on this at a later stage.

Regarding terminology used herein, a network switch forwards a packet to another network device. A network router forwards data packets from one router to another to route data packets between computer networks. It should be appreciated that, in this era of virtualization and virtual networks as well as physical networks, a network device that is playing the role of a network router in terms of physical networks may be playing the role of a network switch in terms of a virtual network or an extended virtual network, and vice versa. Embodiments described herein are thus applicable to routers or switches, i.e., a network device that forwards data packets.

FIG. 1 depicts multiple data centers and networks, or one large extended network, and a packet 104 being routed from one data center 102 to another. As shown by the packets 104 with dashed outlines, in many cases there is more than one path from a first data center 102 to a second data center 102, just as there is often more than one path from one node to another node in a data center 102 or outside a data center 102. In this depiction, each data center 102 has multiple routers or switches, such as spine switches 110, leaf switches 112, the edge switch 108, and multiple servers 106 in various arrangements. Further arrangements of routers and switches in or outside of a data center 102 are readily devised, and FIG. 1 is but an example and not limiting to the present embodiments. Each data center 102 has an edge switch 108 that routes packets to other data centers 102 along inter-data center links, and is responsible for detecting when a particular path from one data center 102 to another data center 102, e.g., from one node to another, is up or down. As used herein, a hop is the travel of a packet 104 from one node to another node along a path between the nodes.

Cost for sending a network packet 104, in terms of bandwidth, speed, distance, latency, number of hops or other physical constraints, and monetary value, may not be the same over various paths. Policy-based routing supports use of a service classification field in a packet 104 to indicate to what class of service a packet belongs, so that the packet 104 can be routed accordingly. This is implemented, traditionally, in the differentiated services code point (DSCP), which is a six bit code in an eight bit field in the IPv4 (Internet protocol version 4) and IPv6 (Internet protocol version 6) headers of packets. For example, a backup job or other background task could be designated a lower priority traffic class than an HTTP (hypertext terminal protocol) request, or audio or video streaming, which would have higher priority traffic classes. By sending a packet with a DSCP, the network can take advantage of this indication of priority within the packet. With policy-based routing, depending on the traffic class, a router or switch could send a packet in one hop, or two hops, or more hops, from a source to a destination, e.g., as specified by a destination IP address.

One solution for using policy-based routing is to take a routing table, populated by destination IP addresses, and multiply this table by the number of service classes, and put this in a ternary content addressable memory (TCAM) or other type of lookup table. In contrast to binary CAM, which can match an entry in the CAM to ones and zeros in an input, ternary CAM or TCAM can match an entry in the TCAM to ones, zeros and one or more "X" or "don't care" bits in an input. TCAM is typically used for matching on multiple fields simultaneously. There are other kinds of lookup tables. In one example of this, each destination IP address is repeated as many times as the number of service classes, in the TCAM or other lookup table, with each entry having a unique service class (or, for one default entry, no service class). There are thus as many entries in the TCAM or other lookup table as the total number of destination IP addresses multiplied by the total number of service classes (or that plus 1, for the case of no service class). Each entry in the TCAM or other lookup table can match a destination IP address and match a service class, and output a destination next hop for the packet as a response in a single matching operation. However, because the number of entries is equal to the product of the number of destination IP addresses and the number of service classes, this does not scale well for large networks (i.e., with large numbers of destination IP addresses and large numbers of service classes). Embodiments described below with reference to FIGS. 2-4 improve upon this situation, by using two distinct matching operations. The first matching operation scales linearly with the number of IP addresses. The second matching operation scales linearly with the number of service classes. Embodiments thus scale linearly, not polynomially.

Figure 2:
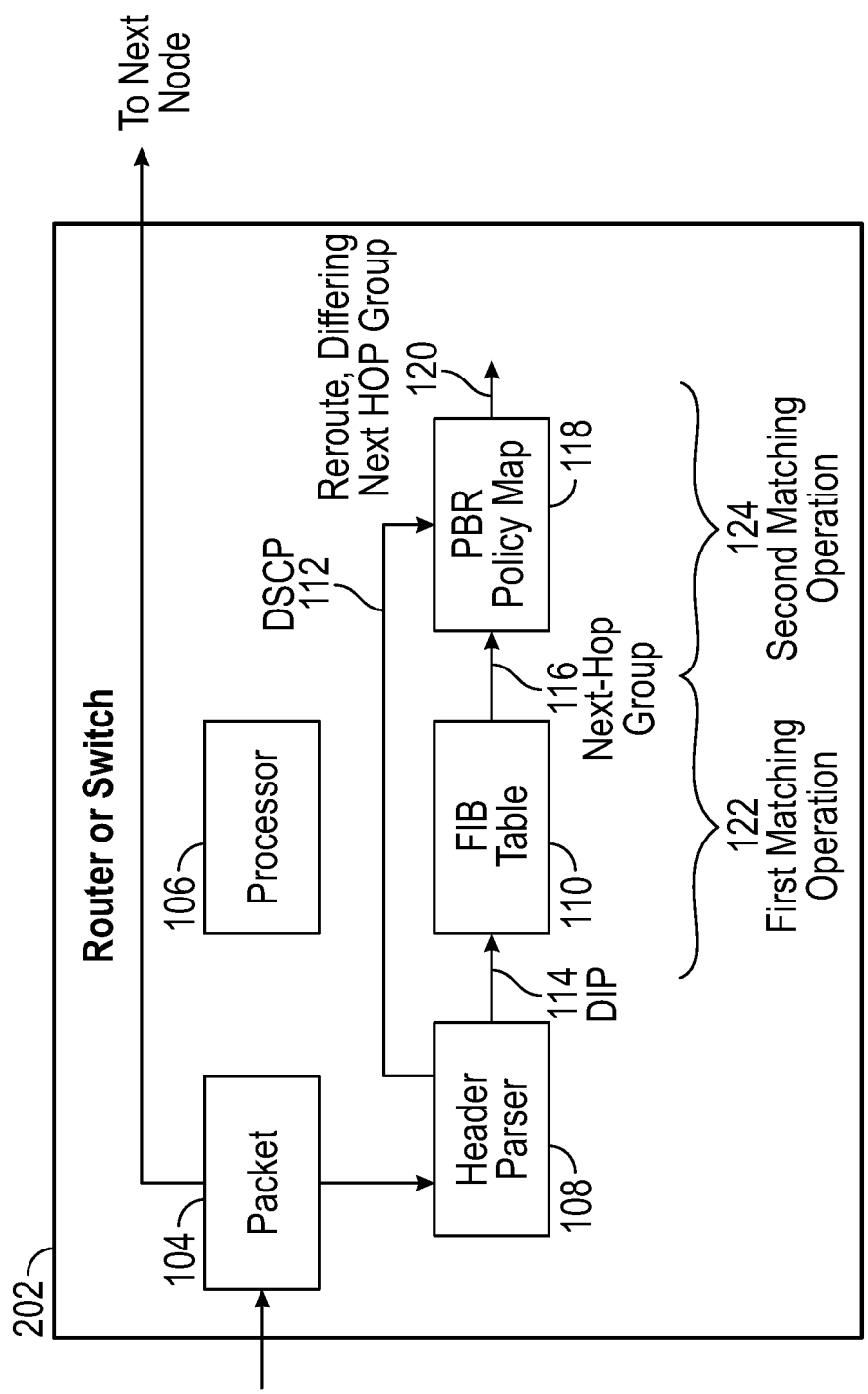
FIG. 2 is a block diagram of a router or switch that performs a first matching operation to determine a next-hop group for a packet, and a second matching operation to reroute the packet to a differing next-hop group when there is a match to a differentiated services code point from the header of the packet, and is suitable for use in a network in FIG. 1.

FIG. 2 is a block diagram of a router or switch 202 that performs a first matching operation 122 to determine a next-hop group 116 for a packet 104, and a second matching operation 124 to reroute the packet 104 to a differing next-hop group 120 when there is a match to a differentiated services code point 112 from the header of the packet 104. This and further embodiments are suitable for use in a network in FIG. 1, and other networks. The router or switch 202 has a processor 106, a header parser 108, a forwarding information base (FIB) table 110, and a policy-based routing policy map 118. The various components in the router or switch 202 can be implemented using hardware, firmware, software executing on the processor 106, or combinations thereof. In some embodiments, the next-hop groups 116, 120 each define a forwarding equivalence class (FEC) for packets that are routed in a similar manner, as used in multiprotocol label switching (MPLS). The FIB table 110 is then used as a multiprotocol label switching map that maps IP addresses to next-hop groups.

A packet 104, received into the router or switch 202, is to be routed to a next node. A header parser 108 extracts the destination IP address or DIP 114 and the differentiated services code point or DSCP 112 (i.e., the value of the bits in the DSCP) from the header of the packet 104 (when available), and presents these to the first matching operation 122 and the second matching operation 124. The first matching operation 122, which is implemented using a forwarding information base or FIB table 110 in some embodiments, receives the destination IP address 114, matches it to contents in the FIB table 110, and outputs a next-hop group 116 as a result of matching the destination IP address 114 in the FIB table 110. The next-hop group 116 indicates the next node to which the packet should be routed (unless rerouted according to a result from the second matching operation 124). Some embodiments use a lookup table, in which an object name as an output of the FIB table 110 is looked up to provide an IP address or other identifier of the next node. An example of first matching operation 122 is shown after the discussion of FIG. 3.

The second matching operation 124, which is implemented using a policy-based routing policy map 118 in some embodiments, receives as an input the next-hop group 116 that is an output from the first matching operation 122, and also receives as an input the differentiated services code point 112. When there is a match to these in the PBR policy map 118, this outputs a differing next-hop group 120 as a result of the match. The differing next-hop group 120 (i.e., a next-hop group that differs from the next-hop group 116 output from the first matching operation 122) indicates another next node to which the packet should be routed instead of sending the packet to the next-hop group 116 indicated by the first matching operation 122. That is, the match in the PBR policy map 118 indicates that the packet 104 should be rerouted to the differing next-hop group 120 that is the output of the PBR policy map 118. Some embodiments use a lookup table, such as described above, in which an object name as an output of the PBR policy map 118 is looked up to provide an IP address or other identifier of the next node, per the differing next-hop group 120. This could be the same lookup table as used above to look up an IP address or other identifier of the next node per the FIB table 110 output.

Figure 3:
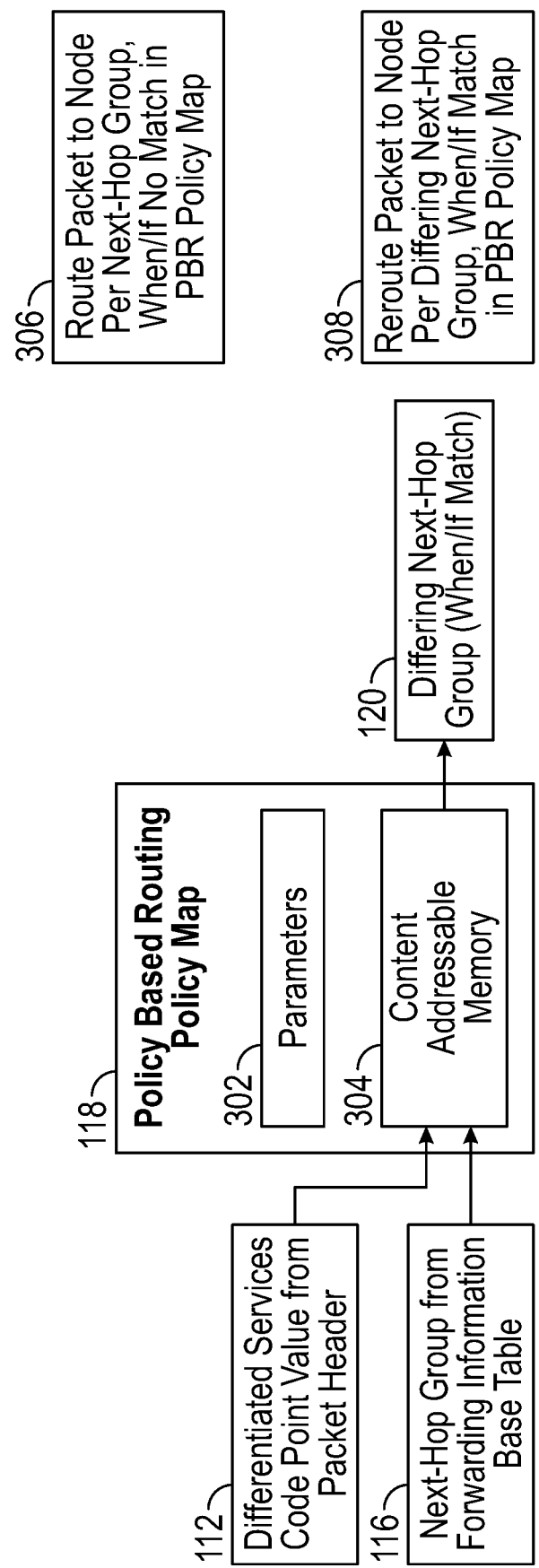
FIG. 3 is a block diagram of an embodiment of a policy-based routing policy map that uses content addressable memory, and is suitable for use in the router or switch of FIG. 2.

FIG. 3 is a block diagram of an embodiment of a policy-based routing policy map 118 that uses content addressable memory 304, and is suitable for use in the router or switch 202 of FIG. 2. In one embodiment, the content addressable memory 304 is TCAM. The policy-based routing policy map 118 has a block for parameters 302, which could include registers or other form of memory. Or, the parameters 302 could be embedded in software executing on the processor 106 of the router or switch 202 shown in FIG. 2. The parameters 302, which include DSCP values and next-hop groups to be matched in the content addressable memory 304, and next-hop groups to be output when there are matches in the content addressable memory 304, are loaded into the content addressable memory 304. The content addressable memory 304 thus acts as a fast, hardware-based lookup table or type of map. Further embodiments use other types of lookup tables. Two actions 306, 308 are possible, depending on output of the content addressable memory 304 and policy-based routing policy map 118. In one action 306, the packet should be routed to a node per the next-hop group 116, when and if there is no match in the PBR policy map 118 (or, alternatively, the PBR policy map 118 produces a no-op, a default value or the same next-hop group 116 as a response to matching a lack of a DSCP 112). In another action 308, the packet should be rerouted to a node per the differing next-hop group 120, when and if there is a match in the PBR policy map 118.

With reference to FIGS. 1-3, examples of class-based forwarding for supporting a QoS (quality of service) aware routing feature are described below. The requirement in this feature is to do the next-hop tunnel selection based on both DSCP and destination IP address. This allows a customer to steer traffic belonging to different traffic classes through different paths in a network. While PBR supports matching on these packet fields, and more, the route scale would be limited to the TCAM size, which is smaller in size relative to the FIB table size. Thus a hybrid solution taking advantage of the FIB table scale with the filtering capability offered by TCAM is devised to solve this problem.

Here is a sample configuration for a PBR feature which is supported currently (as of EOS-4.15.0) that steers traffic to certain subnets through different MPLS (multiprotocol label switching) tunnels based on DSCP and DIP. MPLS uses short labels to specify paths for routing from one node to another node in a network.

```
next-hop group ng1 type mpls
   size 1
      entry 0 push label-stack 1234 nexthop 20.1.1.10
!
next-hop group ng2 type mpls
   size 1
      entry 0 push label-stack 2345 nexthop 20.1.2.20
!
next-hop group ng3 type mpls
   size 1
      entry 0 push label-stack 3456 nexthop 20.1.3.30
!
next-hop group ng4 type mpls
   size 1
      entry 0 push label-stack 4567 nexthop 20.1.4.40
!
policy-map   type   pbr   pmap
   10 match ip    any    40.0.0.0/8    dscp    45    set next-hop group ng1
   20 match ip    any    40.0.0.0/8    set    next-hop group ng2
   30 match ip    any    50.0.0.0/8    dscp    45    set next-hop group ng1
   40 match ip    any    50.0.0.0/8    set    next-hop group ng2
   50 match ip    any    60.0.0.0/8    dscp    45    set next-hop group ng3
   60 match ip    any    60.0.0.0/8    set    next-hop group ng4
!
interface Ethernet7
   service-policy type pbr input pmap
```

The above configuration establishes multiple next-hop groups, each with a name or label (e.g., ng1 through ng4). The PBR policy map matches IP addresses and DSCP values, in a single matching operation, and produces a next-hop group as a result of a match. This could be implemented on a content addressable memory 304, but scales as the product of the number of IP addresses and the number of DSCP values or service classes. Specifically, in this example, there are three IP prefixes or subnets (addresses) and two service classes (number 45 and a default service class which is the lack of the service class 45). Corresponding to the product of these, there are six entries in the PBR policy map. Embodiments that use a first matching operation 122 and a second matching operation 124, as described above with reference to FIGS. 2 and 3, improve upon this and scale linearly with IP prefixes or subnets (addresses) and linearly with service classes, rather than with the product of the number of IP prefixes or subnets (addresses) and service classes.

This next example features a PBR enhancement in accordance with present embodiments. As illustrated in the previous section, policy-based routing can match on many different fields in the packet, but matching on the DIP is limiting the scale. To solve this, an enhancement to PBR allows matching on the FIB result, instead of on the DIP. This allows the PBR policy to match on multiple DIPs that all map to the same FIB result, along with DSCP to set the forwarding action. This is illustrated by the sample configuration.

```
FIB routes:
40.0.0.0/8 -> next-hop group ng2
50.0.0.0/8 -> next-hop group ng2
60.0.0.0/8 -> next-hop group ng4
PBR config:
next-hop group ng1 type mpls
   size 1
   entry 0 push label-stack 1234 nexthop 20.1.1.10
!
next-hop group ng2 type mpls
   size 1
   entry 0 push label-stack 2345 nexthop 20.1.2.20
!
next-hop group ng3 type mpls
   size 1
   entry 0 push label-stack 3456 nexthop 20.1.3.30
!
next-hop group ng4 type mpls
   size 1
   entry 0 push label-stack 4567 nexthop 20.1.4.40
!
policy-map type   pbr pmap
   10 match ip   any next-hop group ng2 dscp 45   set next-hop group ng1
   20 match ip   any next-hop group ng4 dscp 45   set next-hop group ng3
!
interface Ethernet7
   service-policy type pbr input pmap
```

In the above configuration, instead of the destination IP filter, there is a new filter called 'next-hop group' (or other newly definable suitable command line interpreter keyword). Using that, embodiments of the router or switch are able to match on all the flows that match to the respective next-hop group in the FIB. In this particular case, both IP address 40.0.0.0/8 and IP address 50.0.0.0/8 forward to next-hop group ng2 in the FIB, and thus rule 10 would match them, and redirect them to next-hop group ng1 if DSCP==45. Similarly rule 20 would redirect traffic to IP address 60.0.0.0/8 to ng3, if DSCP==45. Any traffic that is not matched by PBR would get forwarded with the FIB result.

The following example illustrates a failure scenario. When a tunnel specified in a next-hop group goes down (e.g., due to a link going down), the next-hop group entry would get programmed with a DROP action and traffic would drop. In some versions, the agent that programmed the next-hop group then reprograms it with one or more alternate tunnels to restore traffic. To improve upon that, it would be preferable to minimize the traffic impact during this duration. The solution for this is to dynamically resize a next-hop group when one or more of its paths go down. In this mode, when all the paths used in a next-hop group are down, the PBR would program a NOP action (instead of FORWARD to that down next-hop group), and the packets would be forwarded using the FIB result. That is, the packets would be forwarded using the next-hop group determined by the FIB, as described above in the first matching operation. Once the next-hop group used by PBR is reprogrammed with tunnels that are up, the PBR result would automatically get updated to forward to that next-hop group. Other versions of resizing a next-hop group could include revising the mapping of the next-hop group to one or more nodes in a network, revising the mapping of the PBR policy map 118 (see FIGS. 2 and 3), revising the parameters 302 for the content addressable memory 304 (see FIG. 3), intercepting and substituting for the output of the PBR policy map 118 (e.g., by overriding or trapping, etc.), gating the outputs of the first matching operation 122 and the second matching operation 124 in accordance with a map of which nodes are up or down, and further variations that are readily devised in keeping with the teachings herein.

Figure 4:
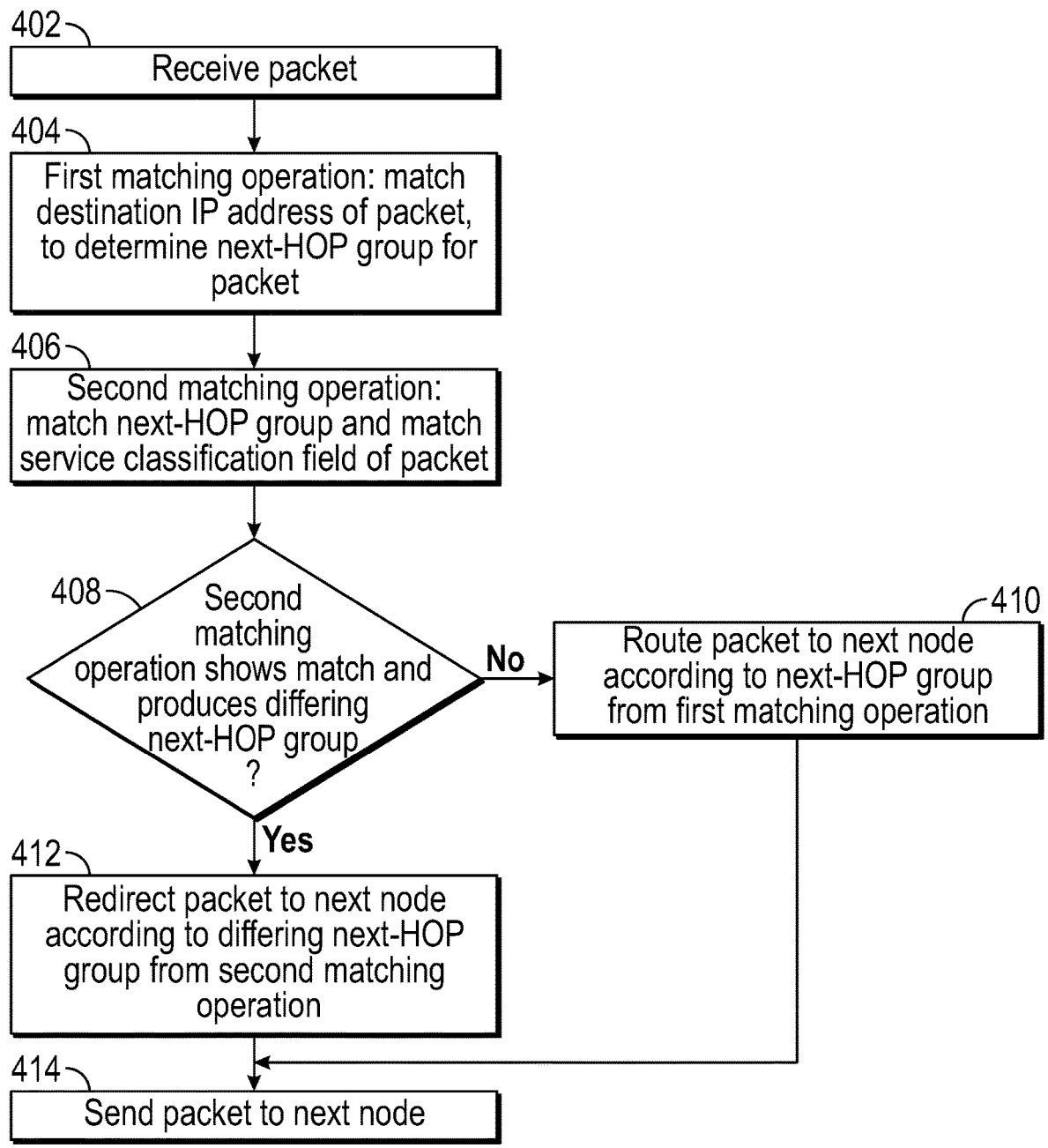
FIG. 4 is a flow diagram of a method for forwarding traffic in a network, which can be practiced by embodiments of the router or switch shown in FIGS. 1-3.

FIG. 4 is a flow diagram of a method for forwarding traffic in a network, which can be practiced by embodiments of the router or switch shown in FIGS. 1-3. In some embodiments, the method can be performed by software executing on a processor, and in some embodiments the method is further performed using a content addressable memory.

In an action 402, a packet is received. The packet has a destination IP address and may have a service classification field in a header of the packet. In a first matching operation, for the action 404, the destination IP address of the packet is matched, to determine a next-hop group for the packet. In some embodiments, the first matching operation uses an FIB table, and produces next-hop groups that list or otherwise point to IP addresses. For example, the FIB results map to a path in the network. Typically, tunnels are set up to define that path. MPLS is one tunnel encapsulation that can be used.

Test In a second matching operation, for the action 406, the next-hop group produced by the first matching operation is matched, and a service classification field of the packet (if available) is matched. Or, other fields in the packet, such as Layer4 TCP port. DSCP or traffic class or TOS (type of service) could be matched, among other possibilities. That is, the second matching operation attempts to match the next-hop group and the service classification field or other field in the packet to specified parameters. In some embodiments, these parameters are in a content addressable memory, which could be a TCAM.

In a decision action 408, it is determined whether the second matching operation shows a match and produces a differing next-hop group. If the answer is no, there is no match and no differing next-hop group, flow branches to the action 410. If the answer is yes, there is a match and the second matching operation produces a differing next-hop group, flow branches to the action 412.

In the action 410, the packet is routed to the next node according to the next-hop group from the first matching operation. In the action 412, the packet is redirected to the next node according to the differing next-hop group from the second matching operation. From action 410 or action 412, flow proceeds to the action 414. In the action 414, the packet is sent to the next node, according to the results from the first or second matching operation, depending upon the outcome from the decision action 408 and associated direction from the action 410 or redirection from the action 412.

Figure 5:
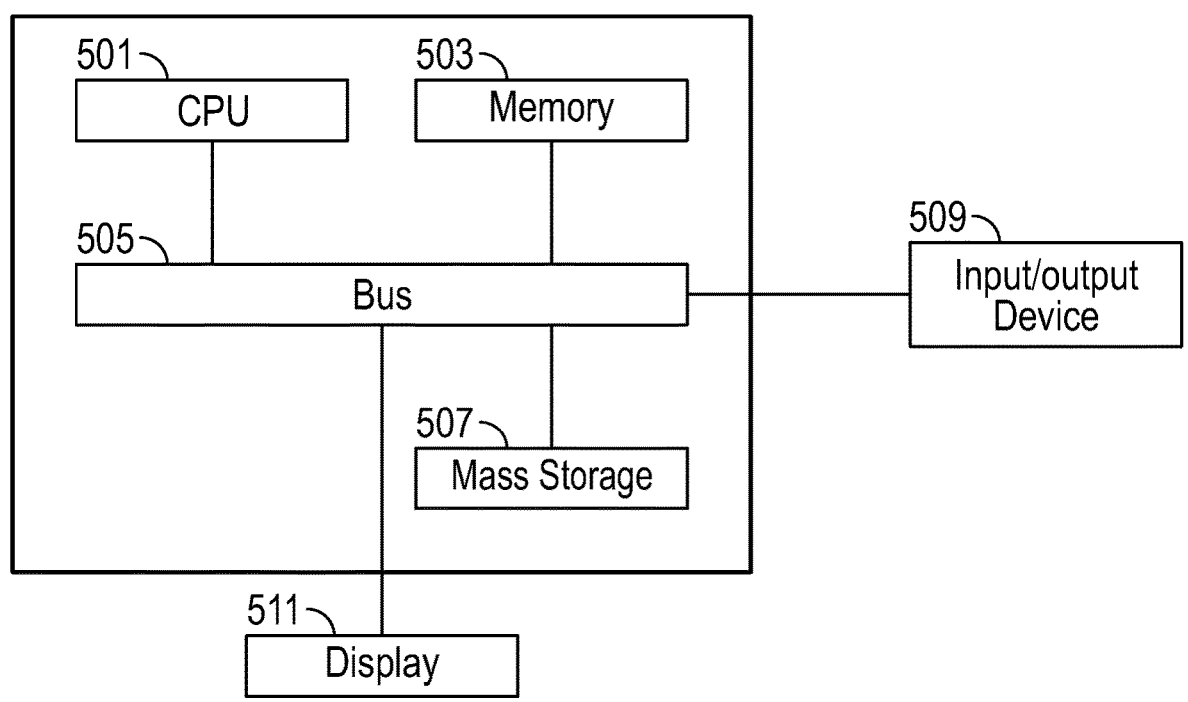
FIG. 5 is an illustration showing an exemplary computing device which may implement the embodiments described herein.

It should be appreciated that the methods described herein may be performed with a digital processing system, such as a conventional, general-purpose computer system. Special purpose computers, which are designed or programmed to perform only one function may be used in the alternative. FIG. 5 is an illustration showing an exemplary computing device which may implement the embodiments described herein. The computing device of FIG. 5 may be used to perform embodiments of the functionality for class-based network packet forwarding in accordance with some embodiments. The computing device includes a central processing unit (CPU) 501, which is coupled through a bus 505 to a memory 503, and mass storage device 507. Mass storage device 507 represents a persistent data storage device such as a floppy disc drive or a fixed disc drive, which may be local or remote in some embodiments. The mass storage device 507 could implement a backup storage, in some embodiments. Memory 503 may include read only memory, random access memory, etc. Applications resident on the computing device may be stored on or accessed via a computer readable medium such as memory 503 or mass storage device 507 in some embodiments. Applications may also be in the form of modulated electronic signals modulated accessed via a network modem or other network interface of the computing device. It should be appreciated that CPU 501 may be embodied in a general-purpose processor, a special purpose processor, or a specially programmed logic device in some embodiments.

Display 511 is in communication with CPU 501, memory 503, and mass storage device 507, through bus 505. Display 511 is configured to display any visualization tools or reports associated with the system described herein. Input/output device 509 is coupled to bus 505 in order to communicate information in command selections to CPU 501. It should be appreciated that data to and from external devices may be communicated through the input/output device 509. CPU 501 can be defined to execute the functionality described herein to enable the functionality described with reference to FIGS. 1-4. The code embodying this functionality may be stored within memory 503 or mass storage device 507 for execution by a processor such as CPU 501 in some embodiments. The operating system on the computing device may be MS DOS™, MS-WINDOWS™, OS/2™, UNIX™, LINUX™, or other known operating systems. It should be appreciated that the embodiments described herein may also be integrated with a virtualized computing system that is implemented with physical computing resources.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a tangible non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand.

The service provider may host the software, or may deploy the software to a customer for a given period of time. Numerous combinations of the above models are possible and are contemplated.

Various units, circuits, or other components may be described or claimed as "configured to" perform a task or tasks. In such contexts, the phrase "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method for traffic forwarding in a network, comprising:
    matching a destination IP (Internet protocol) address (DIP) of a packet, in a forwarding information base (FIB) table to point to a next-hop group for the packet, in a first matching operation;
    redirecting the packet to a differing next-hop group, responsive to matching each of the next-hop group for the packet and a field of the packet in a second matching operation, wherein the field marks the packet as belonging to a class of service; and
    routing the packet to a next node, in accordance with the next-hop group or the differing next-hop group as determined for the packet.

2. The method of claim 1, wherein the first matching operation uses the FIB table as a multiprotocol label switching (MPLS) map that maps IP addresses to next-hop groups.

3. The method of claim 1, wherein the second matching operation uses a policy-based routing (PBR) policy map that maps the next-hop group and a specific value in the field to the differing next-hop group.

4. The method of claim 1, wherein the second matching operation comprises:
    inputting the next-hop group, determined in the first matching operation, and the field to a content addressable memory (CAM); and
    outputting the differing next-hop group from the content addressable memory as a result of matching the next-hop group and the field in the content addressable memory.

5. The method of claim 1, wherein the next-hop group and the differing next-hop group are mapped to nodes in a network.

6. The method of claim 1, wherein the next-hop group and the differing next-hop group each define a forwarding equivalence class (FEC) used in multiprotocol label switching (MPLS).

7. The method of claim 1, further comprising:
    resizing the next-hop group or the differing next-hop group, responsive to detection of a network path being down.

8. The method of claim 1 wherein the next-hop group and the differing next-hop group are each a multi-path object listing a plurality of paths or tunnels.

9. A network element, comprising:
    the network element to perform a first matching operation to determine a next-hop group for a packet based on a destination Internet protocol (IP) address (DIP) of the packet;
    the network element to perform a second matching operation based on the next-hop group for the packet and a field of the packet, to determine whether to redirect the packet to a differing next-hop group; and
    the network element to route the packet to a next node according to the next-hop group or the differing next-hop group as determined for the packet.

10. The network element of claim 9, further comprising:
    the network element having a forwarding information base (FIB) table that matches IP addresses and points to next-hop groups, for use in the first matching operation.

11. The network element of claim 9, further comprising:
    the network element having a policy-based routing (PBR) policy map that matches next-hop groups, determined from the first matching operation, and differentiated services code point (DSCP) values, from the packet, and points to further next-hop groups for redirecting per the second matching operation.

12. The network element of claim 9, further comprising:
    the network element having a ternary content addressable memory (TCAM) to receive the next-hop group, determined from the first matching operation, and a value of the field, as inputs, and output the differing next-hop group.

13. The network element of claim 9, further comprising:
    the network element having a map that maps the next-hop group and the differing next-hop group to nodes in a network.

14. The network element of claim 9, further comprising:
    the network element to program a no-operation (NOP) responsive to detecting all paths used in the differing next-hop group are down, and forward the packet using the next-hop group determined by the first matching operation.

15. The network element of claim 9, further comprising:
    the network element to revise the differing next-hop group, responsive to detecting a network path in the differing next-hop group being down.

16. The network element of claim 9 wherein the next-hop group and the differing next-hop group are each a multi-path object listing a plurality of paths or tunnels.

17. A tangible, non-transitory, computer-readable media having instructions thereupon which, when executed by a processor in a network element, cause the processor to perform a method comprising:
- performing a first matching operation, to match a destination IP (Internet protocol) address (DIP) of a packet and determine a next-hop group for the packet;
- performing a second matching operation, to match the next-hop group for the packet and to match a field of the packet, and determine to redirect the packet to a differing next-hop group; and
- routing the packet to a node as directed by the differing next-hop group.

18. The computer-readable media of claim 17, wherein performing the first matching operation comprises:
- inputting the destination IP address of the packet to a forwarding information base (FIB) table; and
- outputting the next-hop group as a result of matching the destination IP address in the forwarding information base table.

19. The computer-readable media of claim 17, wherein performing the second matching operation comprises:
- inputting the next-hop group determined by the first matching operation, to a policy-based routing (PBR) policy map;
- inputting a value of the field, to the policy-based routing policy map; and
- outputting the differing next-hop group as a result from the policy-based routing policy map.

20. The computer-readable media of claim 17, wherein performing the second matching operation comprises:
- inputting the next-hop group determined by the first matching operation, to a content addressable memory (CAM) of the network router or switch;
- inputting a value of the field, to the content addressable memory; and
- outputting the differing next-hop group as a result from the content addressable memory.

21. The computer-readable media of claim 17, wherein the method further comprises:
- mapping the next-hop group and the differing next-hop group to nodes in a network.

22. The computer-readable media of claim 17, wherein the method further comprises:
- resizing the differing next-hop group in response to determining that one or more paths included in the differing next-hop group are down.

23. The computer-readable media of claim 17 wherein the next-hop group and the differing next-hop group are each a multi-path object listing a plurality of paths or tunnels.

* * * * *